Patented Oct. 25, 1932

1,884,418

UNITED STATES PATENT OFFICE

CARY R. WAGNER, OF CHICAGO, ILLINOIS, ASSIGNOR TO THE GYRO PROCESS COMPANY, OF DETROIT, MICHIGAN, A CORPORATION OF MICHIGAN

METHOD OF SEPARATING AND FRACTIONATING OIL

Application filed March 13, 1928. Serial No. 261,410.

This invention relates to an improved method of heating, fractionating and separating the condensible and non-condensible hydrocarbon vapors or fluids which are released from the conversion zones of oil cracking systems.

The present invention is particularly applicable to vapor phase or high temperature methods of oil conversion, wherein oil to be cracked is heated to a vaporous state and then admixed with steam and the resulting mixture of steam and oil vapor passed through a zone of high temperature for the purpose of effecting the molecular decomposition or cracking of the oil vapor. After the vapors have been subjected to the high heat region for a period of time sufficient to produce the desired degree of cracking, the vapors are cooled and are then transferred to separating or fractionating apparatus in which the several fractions of the vapors having different boiling points are relatively separated and condensed, provision being made for the removal in a separated condition of the fixed gases and the water content resulting from the use of steam and it is particularly to the separation or fractionation of these fluids and the treating thereof to remove certain undesirable compounds that the present invention is directed.

In the operation of certain vapor phase systems of oil conversion it has been found desirable, in order to remove compounds from the oil which tend to discolor the same and which form gum deposits therein, to pass the oil vapors obtained from a cracking still through a tower containing a body of filtering material in the form of fuller's earth. Hitherto it has been customary to pass oil vapor, fixed gases, steam or water directly from the converter through the fuller's earth tower. This method has been found to be unsatisfactory for the reason that the fuller's earth is required to handle an immense amount of material which does not require such treatment, with the result that the fuller's earth rapidly loses its value as a filtering or purifying material so that frequent replacement thereof with fresh fuller's earth has been necessary to keep the system in its most efficient operative condition.

In accordance with the present invention a method is provided whereby the undesired oils, fixed gas, steam or water are removed from the oil vapors or liquids which require treatment with the fuller's earth, so that the quantity of oil and oil vapors passing through a given body of fuller's earth will be more effectively and efficiently filtered than has been accomplished in the past, for the reason that the extraneous or unnecessary materials are first removed and only that portion of the cracked stock which requires filtration is passed through the fuller's earth. Another advantage resides in the fact that oil vapors which are passed through the fuller's earth bed may be maintained at a considerably higher temperature than when mixed with the undesirable compounds. This enables the fuller's earth to react with the oil vapors to better advantage in effecting a more complete removal of the undesirable color and gum forming compounds.

I do not limit myself to the use of fuller's earth alone in the treatment of the oil vapors for the purpose of improving color and removing polymers, since the invention is also applicable to other materials and methods such as the treatment of the oil vapors with mild sulphuric acid compounds.

In the accompanying drawing there has been disclosed diagrammatically apparatus for carrying out the present invention in one of its preferred forms.

Referring more particularly to the drawing the numeral 1 designates the setting of an oil heater or converter. Within this setting there is positioned a bank of oil converting tubes 2 through which is adapted to pass a current of oil vapor in order that such vapor may be subjected to the internal heat of the furnace and its temperature raised sufficiently to effect the desired conversion reactions. The oil enters the tubes by way of the pipe line 3 and, if desired, superheated steam may be mixed with these oil vapors by being introduced into the line 3 as indicated at 4. The temperature of the oil vapor within the converter is raised to a point in excess of 1000°

F., while the vapors are maintained under a pressure not in excess of two atmospheres. It will be understood, however, that I do not limit myself to these precise temperatures or pressures, since the present invention is applicable to any vapor phase method of oil conversion.

When the vapors leave the outlet 4 of the tube bank 2, the same are discharged into a jet condenser 5 into which is forced fresh cool oil by way of the pipe line 6 from the storage tank 7. The heated oil vapors issuing from the converter are shock chilled by coming into intimate contact with the cool charging stock so that conversion reactions are checked and the oil vapor sufficiently lowered in temperature so that the heavier ends thereof will condense in the bottom of the condenser 5 and are there intermingled with the fresh charging stock, which has not been vaporized by a contact with the heated vapors. The liquid in the bottom of the condenser 5 is transferred by means of a pipe line 8 to the bottom of a fractionating tower 9, while the vapors or gases are drawn off from the top of the jet condenser by way of a pipe line 10 and are led to the interior of the fractionating tower 9 at a position intermediate of the length of the latter.

Within the fractionating tower the low boiling fractions of the oil, together with the fixed gases pass upwardly through the tower, while the liquids, which accumulate in the bottom of said tower are drawn off by way of pipe lines 11 and 12. The first of these lines extends to a hot oil pump 13 and the pipe line 14, leaving the discharge side of this pump leads to an intermediate heater or vaporizer 14' and thence to the oil line 3 of the inlet side of the converter. The excess oil, which accumulates in the bottom of the tower 9, is drawn off by way of the pipe line 12 in a heated state, usually at a temperature of approximately 480° F. and use is made of this heated oil to procure certain heat economies hereinafter specifically set forth.

The oil vapors or gases released from the top of the tower 9 pass by way of a pipe line 15 to a water cooled condenser 16, where the condensible materials are reduced to liquid form and are discharged into a decanter 17. In this decanter there takes place a separation of the gases, oil and water, the gases or non-condensibles being removed by way of the outlet 18 from the system, the water by way of the outlet 19 and the oil by way of the pipe line 20. By this method of operation the oil to be treated is free from extraneous materials which do not require color and gum removing treatment and the entire operation of the system accordingly is simplified and rendered more effective and economical.

The oil from the decanter is forced through the pipe line 20 by means of a pump 21 and in the line 20 there is arranged a heat exchanger 22. The pipe line 12 which conducts excess oil away from the mouth of the tower 9, passes through the exchanger 22 for the purpose of heating the oil pumped through the line 20. Ordinarily, the oil in the line 12 maintains an average temperature of approximately 480° F. and this hot oil is utilized by the exchanger 22 to raise the temperature of the oil released from the decanter after such oil has passed through the pump 21.

The pipe line 12 after passing through the heat exchanger 22, also passes through a second exchanger 23. The exchanger 23 carries a body of water which is reduced to superheated steam by the heat of the oil passing through the line 12. The superheated steam may be introduced into the system by way of the pipe line 4 at a point ahead of the converter 1. After passing through the condenser 23 the oil passes through a water cooled coil 24 where its temperature is reduced to approximately 100° C. and from the cooler 24 the oil passes into a tank 25 and thence back to the storage tank 7 by way of the line 26.

The oil pumped through the pipe line 20, after it leaves the exchanger 22, enters a fractionating column 27, the lower portion of which being provided with a hot oil reservoir 28 which is adapted to be heated, if necessary, by a burner 29. That portion of the oil which does not vaporize within the reservoir 28, but remains in liquid form, is withdrawn by way of a pipe line 30 and removed from the system. The lighter or vaporized fractions of the oil introduced into the fractionating column 27, pass overhead from the latter by way of a pipe line 31 and while in a state of vapor are introduced into one of a plurality of fuller's earth towers 32. Each of these towers contain a bed of fuller's earth or other equivalent material, as indicated at 33, and the heated oil vapors, at a temperature of 425° F. circulate or pass through the filtering material which, as is well known, operates in the ordinary manner to remove undesirable compounds from the oils. These undesirable compounds are in the nature of polymers which tend to discolor the final distillate or to produce gum forming compounds therein which must be removed before the distillate is suitable for motor fuel purposes. The heavy fractions or polymers accumulate in liquid form in the bottoms of the towers 32 and are withdrawn by way of the pipe lines 34. The lighter or vaporous fractions, following filtration through the fuller's earth bed, are removed by way of the pipe line 35 and after passing through a small fractionating tower 36 the vapors are led to a condenser 37 and reduced to liquid form and are then discharged into a storage tank as finished motor fuel.

From the foregoing, it will be seen that the present invention provides a system of oil treatment and fractionation by means of which a desired motor fuel product may be obtained free from undesirable compounds which would interfere with the value of such a product as a motor fuel distillate. By removing the water and non-condensibles from the motor fuel fractions the fuller's earth or other treating apparatus is used in connection with only that portion of the hydrocarbons originally introduced into the system, which have direct value as motor fuel. This greatly increases the efficiency of the fuller's earth towers or other treating apparatus and permits a given body of fuller's earth to be employed efficiently for a longer period of time than has been heretofore secured by the previous methods of passing all materials through the fuller's earth towers. Furthermore, the fuller's earth operates to better advantage at the higher oil temperatures which obtains by the use of this system, since the mean temperature of the oil vapors when in contact with the treating materials is materially higher than the corresponding temperatures of the intermingled fluids heretofore employed. It will be understood that I do not limit myself to the precise arrangements and steps of operation above specifically set forth, but reserve the right to employ all such variations or modifications of the invention that may be said to fall fairly within the scope of the subjoined claim.

What is claimed is:

In the treatment of hydrocarbon oils, the process which consists in subjecting a confined stream of cracked oil vapor to fractionation to remove from such oil vapor compounds possessing an undesirably high boiling range, subsequently condensing said vapors to produce a condensate of low boiling range, passing such condensate to a treating zone to effect the removal therefrom of undesirable gum-forming and color-imparting bodies, removing the oils of undesirable high boiling range from the fractionating zone in two streams, passing one of said streams through a conversion zone to subject said latter oils to molecular decomposition, introducing into the oils discharged from the converter a body of fresh oil obtained from a source of supply, passing such fresh oil together with the cracked oils to the fractionating zone, passing the other stream of high boiling oil from the fractionating zone through a series of heat exchangers and thence back to the source of fresh oil supply, developing steam in one of said heat exchangers for introduction into the oils passing to the conversion zone, and utilizing the other heat exchanger for preheating the condensate passing to the treating zone.

In testimony whereof I affix my signature.

CARY R. WAGNER.